United States Patent [19]

Marom et al.

[11] Patent Number: 5,315,095
[45] Date of Patent: May 24, 1994

[54] BEAM WITH EXTENDED CONFINEMENT FOR SCANNING PURPOSES

[75] Inventors: Emanuel Marom, Tel-Aviv; Naim Konforti, Holon; David Mendlovic, Tel-Aviv, all of Israel

[73] Assignee: Symbol Technologies, Inc., Bohemia, N.Y.

[21] Appl. No.: 19,384

[22] Filed: Feb. 18, 1993

[51] Int. Cl.$^5$ .............................................. G06K 7/10
[52] U.S. Cl. ...................................... 235/462; 359/19; 359/24
[58] Field of Search ....................... 359/15, 17, 19, 20, 359/24, 9, 21; 235/462; 250/566, 568, 557, 569, 201.4, 201.5, 201.2

[56] References Cited

U.S. PATENT DOCUMENTS

| | | |
|---|---|---|
| 4,251,798 | 2/1981 | Swartz et al. |
| 4,360,798 | 11/1982 | Swartz et al. |
| 4,369,361 | 1/1983 | Swartz et al. |
| 4,387,297 | 6/1983 | Swartz et al. |
| 4,409,470 | 10/1983 | Shepard et al. |
| 4,460,120 | 7/1984 | Shepard et al. |
| 4,469,407 | 9/1984 | Cowan et al. ........................ 359/15 |
| 4,852,973 | 8/1989 | Durnin et al. |
| 5,047,625 | 9/1991 | Iima et al. |
| 5,080,456 | 1/1992 | Katz et al. |
| 5,164,584 | 11/1992 | Wike, Jr. et al. |

OTHER PUBLICATIONS

"Realization of general nondiffracting beams with computer-generated holograms", Antti Vasara, Jari Turunen, and Ari T. Friberg, Journal Optical Society of America, vol. 6, No. 11, Nov. 1989, pp. 1748–1754.
"Diffraction-Free Beans", Durnin et al., Physical Review Letters, No. 15, Apr. 1987, vol. 58, pp. 1499–1501.
"Exact solutions for nondiffracting beams. I. The scalar theory", J. Durnin, Journal Optic Society of America, vol. 4, No. 4, Apr. 1987, pp. 651–654.
"Nondiffracting optical fields: some remarks on their analysis and synthesis," G. Indebetouw, Journal Optic Society of America, vol. 6, No. 1, Jan., 1989, pp. 150–152.

*Primary Examiner*—Donald Hajec
*Assistant Examiner*—Jeffrey R. Filipek

[57] ABSTRACT

Scanner optics, usable for example in a bar code reader, generate a multitude of Gaussian beams derived from a common light source to produce a beam with extended working range. In the preferred embodiment, a 360 degree fan of Gaussian beams is generated by passing a laser beam through at least one diffractive element, e.g., computer generated holographic (CGH) plate, computed to perform the transformation of the illuminating beam into the desired output beam. The beam thus produced, having a small diameter over a large longitudinal distance, is useful for long range scanning.

37 Claims, 6 Drawing Sheets

BEAM WITH EXTENDED CONFINEMENT FOR SCANNING PURPOSES

TECHNICAL FIELD

The invention relates to optical scanning devices such as barcode scanners, image scanners, plotting devices, laser machining devices and more particularly to an optical system generating a light beam with an extended depth of focus or working range. The principle and implementation described for light beams and optical systems are readily converted to other electromagnetic or acoustic beams and devices for radar and sonar implementation.

BACKGROUND ART

Optically encoded information, such as barcodes, have become common. A barcode symbol consists of a series of light and dark regions, typically in the form of rectangles. The widths of the dark regions, the bars, and/or the widths of the light spaces between the bars indicate the encoded information. A specified number, widths, and arrangement of these elements represent a character. Standardized encoding schemes specify the arrangements for each character, the acceptable widths and spacings of the elements, the number of characters a symbol may contain or whether symbol length is variable, etc. The known symbologies include, for example, UPC/EAN, Code 128, Codabar, and Interleaved 2 of 5.

Readers and scanning systems use electro-optical means to decode each symbol, thus providing multiple alphanumerical characters that typically are descriptive of the article to which the symbol is attached or some characteristic thereof. Such characters are typically represented in digital form as an input to a data processing system for applications in point-of-sale processing, inventory control, and the like. Scanning systems of this general type have been disclosed, for example, in U.S. Pat. Nos. 4,251,798; 4,360,798; 4,369,361; 4,387,297; 4,409,470, and 4,460,120, all of which have been assigned to Symbol Technologies, Inc.

To decode a barcode symbol and extract a legitimate message using such optical scanners, a barcode reader scans the symbol to produce an analog electrical signal representative of the scanned symbol. A variety of scanning devices are known. The scanner could be a wand type reader including an emitter and a detector fixedly mounted in the wand, in which case the user manually moves the wand across the symbol. Alternatively, an optical scanner scans a light beam such as a laser beam across the symbol, and a detector senses the light reflected from the symbol.

In either case, the detector senses reflected light from a spot scanned across the symbol and provides the analog scan signal representing the encoded information.

A digitizer processes the analog signal to produce a square wave where the widths and spacing between the square boxes correspond to the width of the bars and the spacing between bars. The digitizer serves as an edge detector or wave shaper circuit, and the threshold value set by the digitizer determines what points of the analog signal represent bar edges. The threshold level effectively defines what portions of a signal the reader will recognize as a bar or a space.

The signal from the digitizer is applied to a decoder. The decoder first determines the square shape widths and spacings of the signal from the digitizer. The decoder then analyzes the widths and spacing to find and decode a legitimate barcode message. This includes analysis to recognize legitimate characters and sequences, as defined by the appropriate code standard. This may also include an initial recognition of the particular standard the scanned symbol conforms to. This recognition of the standard is typically referred to as autodiscrimination.

Different barcodes have different information densities and contain a different number of elements in a given area representing different amounts of encoded data. The denser the code, the smaller the elements and spacings. Printing of the denser symbols on an appropriate medium is exacting and thus is more expensive than printing low resolution symbols. The density of a barcode symbol can be expressed in terms of the minimum bar/space width called also "module size" or as a "spatial frequency bandwidth" of the code, which is the inverse of twice the minimum bar or space width.

A barcode reader typically will have a specified resolution often expressed by the module size that is detectable by its effective scanning spot. For optical scanners, for example, the beam spot size is larger than approximately the minimum width between regions of different light reflectivities, i.e., the bars and the spaces of the symbol. The resolution of the reader is established by parameters of the emitter or the detector, by lenses or apertures associated with either the emitter or the detector by angle of beam inclination, by the threshold level of the digitizer, by programming in the decoder, or by a combination of two or more of these elements. In a laser beam scanner the effective sensing spot typically corresponds closely to the size of the beam at the point it impinges on the barcode. The photodetector will effectively average the light detected over the area of the sensing spot.

The distance within which the barcode scanner is able to decode a barcode is called the effective working range of the scanner. Within this range, the spot size is such as to produce accurate readings of barcodes for a given barcode line density. The working range relates directly to the characteristics of the scanner components and to the module size of the barcode.

Typically, an optical barcode scanner includes a light source, such as a gas laser or semi-conductor laser, that generates the light beam. The light beam is optically modified, typically by a lens, to form a beam spot of a certain size at a prescribed distance. The optical scanner further includes a scanning component and a photodetector. The scanning component sweeps the beam spot across the symbol. The photodetector has a field of view which extends across and slightly past the symbol and functions to detect light reflected from the symbol. The electrical signal from the photodetector is converted into a pulse width modulated digital signal, then into a binary representation of the data encoded in the symbol, and then to the alphanumeric characters so represented, as discussed above.

Many known barcode scanning systems collimate or focus the laser beam using a lens system to create a beam spot of a given diameter at a prescribed distance. The intensity of the laser beam at this point, in a plane normal to the beam (i.e., parallel to the symbol), is ordinarily characterized by a "Gaussian" distribution with a high central peak. The working range is defined as the region within which the intensely bright beam spot can decode the information after being scanned across the barcode symbol. One desires a large longitudinal distance within which range the designed beam allows barcode patterns to be accurately scanned. But as the distance between the scanner and the symbol moves out of the working range of the scanner, which is typically only a few inches in length for most common barcode densities, the Gaussian distribution of the beam spot greatly widens as a result of beam diffraction, preventing accurate reading of a barcode. This widening effect is more pronounced for narrow "pencil" beams, necessary for scanning fine barcode patterns. The laws of physical optics predict that a uniform beam with a circular aperture of radius "a" will spread in free space within a cone with a half angle of $0.61\lambda/a$, where is wavelength of the beam.

The far field region, where the beam spreads at this rate, starts at the distance $$z = \pi a^2/\lambda$$

For a beam of Gaussian profile, the field amplitude distribution in the plane of its waist (narrowest region) is $\exp(-r^2/\omega^2_o)$, where $\omega_o$ is the waist radius. Such a beam spreads with a half angle of $\lambda/\pi\omega_o$ before and after a corresponding Rayleigh distance (or confocal beam parameter) of $H = \pi\omega^2_o/\lambda$.

Because the requirements of the scan beam to be of narrow diameter and to be maintained at uniform diameter for a long distance are contradictory, present scanning systems must be positioned within a relatively narrow range of distances from a symbol in order to properly read it. For example, a scanning beam with a wavelength $\lambda$ of 0.67 $\mu$m, and an aperture of 15 mils or 0.38 mm ($=2\omega o$) will provide a working range ($=2H$) of 340 mm. Finer beams of smaller diameter will have much shorter working ranges.

It has been recently shown (J. Durnin, Exact Solutions for Nondiffracting Beams, JOSA A, 4, 651 (1987), also U.S. Pat. No. 4,852,973), that a beam with an amplitude profile given by the Bessel function of zero order $J_o(\alpha r)$, r denoting the transverse distance propagates *without expansion*. It is obvious that such a beam is unrealizable in a practical optical system, due to its infinite lateral extent. The energy is spread out, so that same energy is contained in rings of equal width. Such a beam cannot be used for barcode scanning due to the infinitely wide spread of energy in its cross-section, as a result of which the detected signal has very low contrast.

Nevertheless, it has been shown that a $J_o(\alpha r)$ distribution can be generated by a circular fan of a multitude of plane waves propagating at an angle $\theta$ with respect to the z-axis, i.e. by integrating all plane waves propagating at an angle $\theta$ with respect to the z-axis. One device that comes "close" to that distribution is the "axicon," which indeed generates a circular fan of semi-plane waves, but those are not of infinite extent.

It has been shown that axicons provide a limited region where the "quasi $J_o$" distribution is obtained (see J.H. McLeod, "Axicon: A new type of optical element", JOSA A, 44, 592 (1954)), G. Indebetouw, "Nondiffracting optical fields . . . ", JOSA A, 6, 150 (1989)), A. Vasara et al., "Realization of general nondiffracting beams . . . ", JOSA A, 6, 1748 (1989)). Scanning optics implementing the axicon are described in Katz et al., U.S. Pat. No. 5,080,456 and Marom et al. copending application Ser. No. 07/936,472, filed Aug. 28, 1992, both assigned to Symbol Technologies, Inc.

An axicon has a region given by $a/\theta = (n-1)\alpha$ whereby a "quasi-Bessel distribution" is generated. In this relation, a=aperture radius, n=index of refraction of the axicon material, $\alpha$=angle between surfaces of the axicon and $\theta$=resulting phase front tilt. Although the extent of the beam is limited in its cross-section, the quasi-Bessel distribution achieved is similar to the ideal "non diffractive" beam, thus also suffering from same poor signal contrast, as mentioned above.

DISCLOSURE OF THE INVENTION

One object of the invention is to produce optic elements that generate a wave front energy distribution which provides slim and elongated beams, superior to those obtainable by other beam forming mechanisms such as lenses and axicons.

Another object of the invention is to increase the working range of an optical scanner.

A further object is to implement novel optics to extend the range of an optical beam for long range scanning.

A still further object is to produce scanning optics to generate a narrow scanning beam having minimum spreading of the beam diameter in the longitudinal direction, and improved modulation contrast.

The above and other objects and advantages of the invention are carried out in the invention, by a barcode scanner comprising means for generating the effect of a plurality of Gaussian light beams circularly distributed around a common axis at a given tilt angle and intersecting each other in a common spatial region to form a composite beam of light, means for directing the composite beam of light toward information to be scanned and causing the composite beam to move along a scan line, and a light detector positioned to receive light reflected from the scanned information. In the preferred embodiment, the light source is a laser, and at least one optical element is positioned in the path of the beam generated by the laser to produce a composite beam having predefined amplitude and phase distribution.

Additional objects, advantages and novel features of the invention will be set forth in part in the description which follows, and in part will become apparent to those skilled in the art upon examination of the following or may be learned by practice of the invention. The object and advantages of the invention may be realized and attained by means of the instrumentalities and combinations particularly pointed out in the appended claims.

BEST MODE FOR CARRYING OUT THE INVENTION

Figure 4:
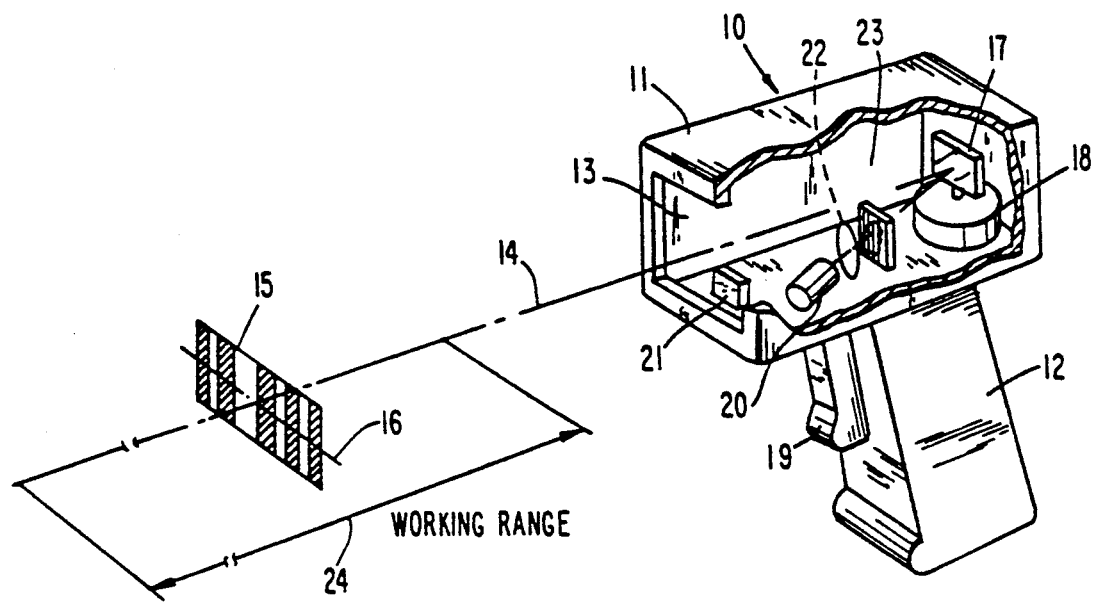
FIG. 4 is a partially sectioned isometric view of a hand-held optical scanner, in accord with the present invention, shown in position for scanning a barcode symbol.

As used in this specification and in the appended claims, the term "indicia" broadly encompasses not only symbol patterns composed of alternating bars and spaces of various widths as commonly referred to as barcode symbols, but also any other one or two dimensional graphic patterns. In general, the term "indicia" may apply to any type of pattern or optically encoded information which may be read or identified by scanning a light beam and detecting reflected or scattered light as a representation of variations in light reflectivity at various points of the pattern or indicia. FIG. 4 shows a bar code 15 as one example of a "indicia" which the present invention can scan.

Figure 1:
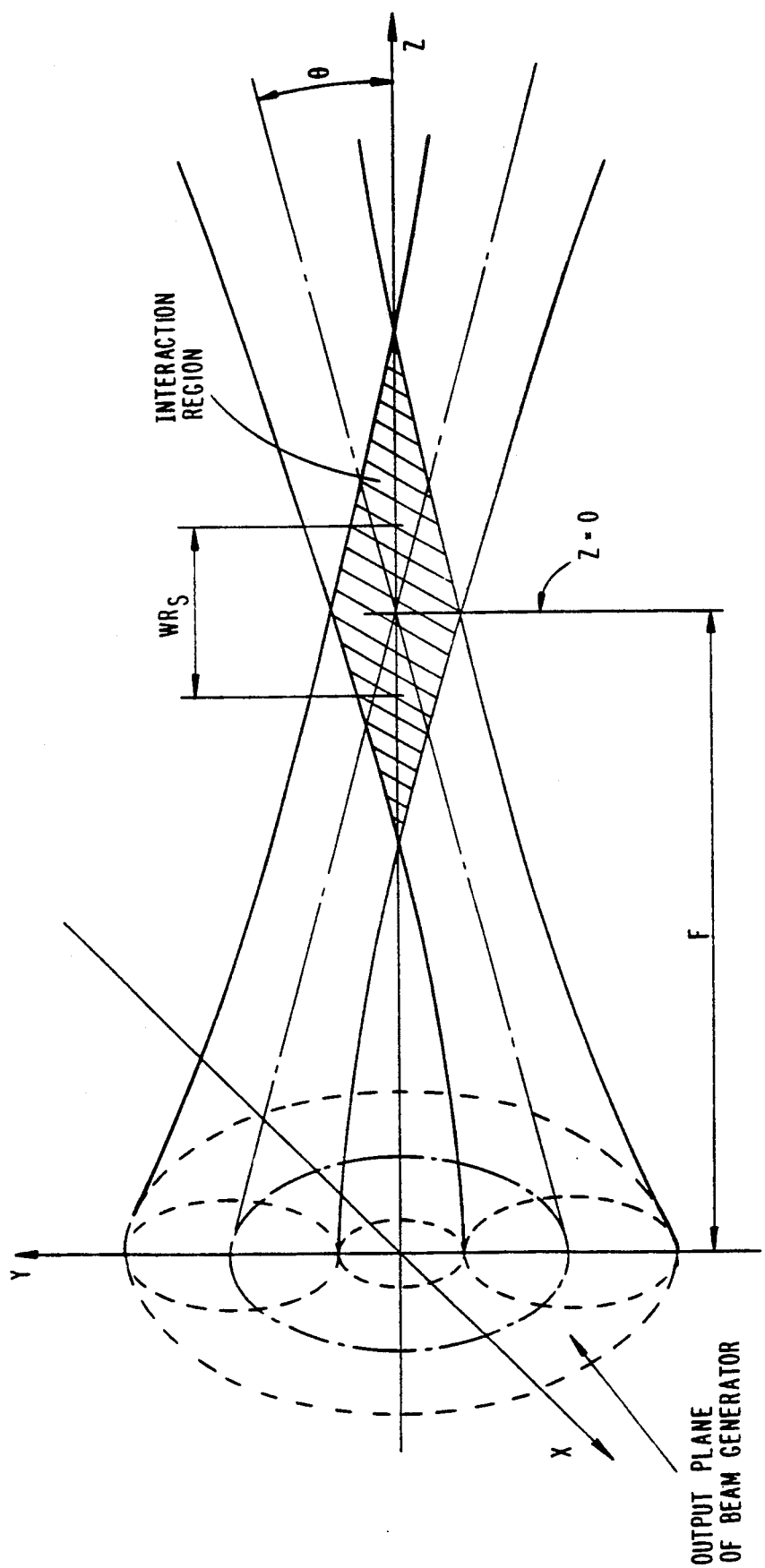
FIG. 1 is a symbolic representation of a multitude of Gaussian beams intersecting each other to form an energy distribution pattern according to the invention.

The present invention is based on our discovery that a beam of narrow elongated structure, suitable for scanning purposes, can be synthesized by intersecting a multitude of Gaussian beams travelling at a common angle $\theta$ with respect to z, the propagation axis, and distributed uniformly on a continuous 360 degree "fan" shown symbolically in FIG. 1. We have determined that a quasi zero-order Bessel function $J_o$ distribution truncated by a Gaussian beam appears at the waist of the intersection of the beams, as will be demonstrated below. Such a synthesized beam profile, characterized by minimum spreading of diameter as the beam propagates, satisfies long range scanning requirements.

This analysis will be based on parameters related to scanning a pattern of single-dimensional structure, most commonly a barcode, and where a single beam is scanned across the pattern and a detector picks up the reflected light. The analysis will assume that the reflected light is averaged (integrated) in one direction.

A signal obtained from beam scanned along the x direction over barcode strips oriented along the y direction, exhibits a certain resolution contrast known as the Modulation Transfer Function or MTF. Evaluation of the MTF is readily obtained by integrating the intensity distribution of the beam in y direction and calculating the Normalized Fourier Transform in x direction:

$$MTF = \frac{FTx\left\{\int_{-\infty}^{\infty} I(x,y)dy\right\}}{\int_{-\infty}^{\infty}\int_{-\infty}^{\infty} I(x,y)dxdy} \quad (1)$$

FTx standing for Fourier Transform in x direction.

The following analysis will compare the scanning capability of simple Gaussian beams propagating on-axis to that of synthesized beams obtained by taking a Gaussian beam propagating at an angle $\theta$ with respect to that axis, replicating it around that axis, and summing up the effect of such beams as shown in FIG. 1.

The transverse amplitude field distribution of a simple Gaussian beam having a waist $\omega_o$ has the form:

$$U_g(r,z) = A_z \exp\left(-\frac{\pi^2}{\lambda(H - iz)}\right) \quad (2)$$

where:
r—the radial distance from the propagation axis z,
$\lambda$—the wavelength of the light beam,
H—the Rayleigh distance $$\left(=\frac{\pi\omega_0^2}{\lambda}\right),$$

$\omega_o$—the radius of the waist,
$A_z$—a complex multiplication factor depending on the position of the examination plane, along the z-axis
$i$—$\sqrt{-1}$ The intensity distribution "I" has the form $$I_g(r,z) = B_z \exp\left(-2\frac{r^2}{\omega^2(z)}\right) \quad (3)$$

where $$\omega^2(z) = \omega^2(z)\left(1 + \frac{z^2}{H^2}\right) \quad (4)$$

The resulting MTF of a scanned pattern (e.g. bars of the barcode symbol) as defined in (1) is obtained by substituting $r^2$ by $x^2+y^2$ in expression (3) and substituting in (1)

$$MTF = \exp\left(-\frac{\pi^2\omega^2(z)f^2}{2}\right) \quad (5)$$

f—denotes the spatial frequency bandwidth of the pattern.

The effective working range (or depth of focus) is known to equal twice the Rayleigh distance $$WR = 2H = 2\frac{\pi\omega_0^2}{\lambda} \quad (6)$$

At the extremities of this range ($z=\pm H$), the radius of the beam $\omega(z)$ becomes $$\omega^2(H) = 2\omega^2_o \quad (7)$$

Thus, the working range exhibiting a minimum contrast ($M = MTF_{min}$) for the entire spatial frequency bandwidth 0 to f, is derived by substituting (7) and (6) into (5) for z=H, $$WR_g = \frac{2}{\pi\lambda f^2} L \quad (8)$$

L denoting ln $$\frac{1}{M}.$$

The extent of the working range of the synthesized composite beam, which represents the subject of this invention is given in the following:

The amplitude field distribution of the synthesized beam consisting of many Gaussian beams covering a continuous fan can be expressed in integral $$U_c(r,z) = A_z \int_0^{2\pi} \exp\{-ik\zeta - \pi\sigma^2/[\lambda(H - i\zeta)]\}d\phi \quad (9)$$

where $\zeta = r\sin\theta + z\cos\theta$ $\sigma^2 = r + z^2\sin^2\theta - r^2\sin^2\theta\cos^2\phi - zr\sin2\theta\cos\phi$ $A_z, r, z$ and $H$ are as defined in Eq.(2), and $\theta$—tilt angle in radians between the axis of any single Gaussian beam forming the fan and the common axis of propagation, z.

The intensity distribution of the beam will now be $$I(r,z) = |U_c(r,z)|^2 \quad (10)$$

For most scanning system implementations $\theta << 1$ and $r << H$ are reasonable assumptions leading to the following approximate expressions:

$$U_c(r,z) \simeq A_z \exp\left(-\frac{\pi r^2}{\lambda(H - iz)}\right) J_0\left(\frac{2\pi}{\lambda} r\theta \frac{1 + i\frac{z}{H}}{1 + \frac{z^2}{H^2}}\right) \quad (11)$$

$$I_c(r,z) \simeq \quad (12)$$

$$|A_g|^2 \exp\left\{\frac{-2\pi r^2}{\lambda H\left(1 + \frac{z^2}{H^2}\right)}\right\} \left|\left(J_0 \frac{2\pi}{\lambda} r\theta \frac{1 + i\frac{z}{H}}{1 + \frac{z^2}{H^2}}\right)\right|^2$$

where $J_o$ is the Bessel function of zero order and first kind.

The achievable working range depends on the minimum acceptable MTF or contrast (M), the spatial frequency bandwidth (F) and a proper selection of the parameters H and $\theta$.

It is useful to express:

$$\theta = f\lambda t \quad (13)$$

$$\theta = f\lambda t \quad (13)$$

$$H = \frac{1}{\lambda f^2} h^2 \quad (14)$$

where the normalized parameters t and h were found empirically to conform to the $$t = 1.058 - 0.532L + 0.171L^2 - 0.0204L^3 + 0.0005L^4 \quad (15)$$

$$h = 1.25 - 5.05L + 7.65L^2 - 3.17L^3 + 0.518L^4 \quad (16)$$

with $$WR_c = \frac{2}{\pi\lambda f^2} d \quad (17)$$

as mentioned earlier.

The expected working range is:

$$WR_c = \frac{2}{\pi\lambda f^2} d \quad (17)$$

where d is a normalized distance found empirically to be:

$$d = 12.4 - 28.8L + 234.2L^2 - 7.81L^3 + 1.08L^4; 0.05 < M < 0.35 \quad (18)$$

Thus the increase of the working range corresponding to the synthesized beam, compared to that of a simple Gaussian beam is:

$$G = \frac{WR_c}{WR_g} = \frac{d}{L} \quad (19)$$

Figure 2:
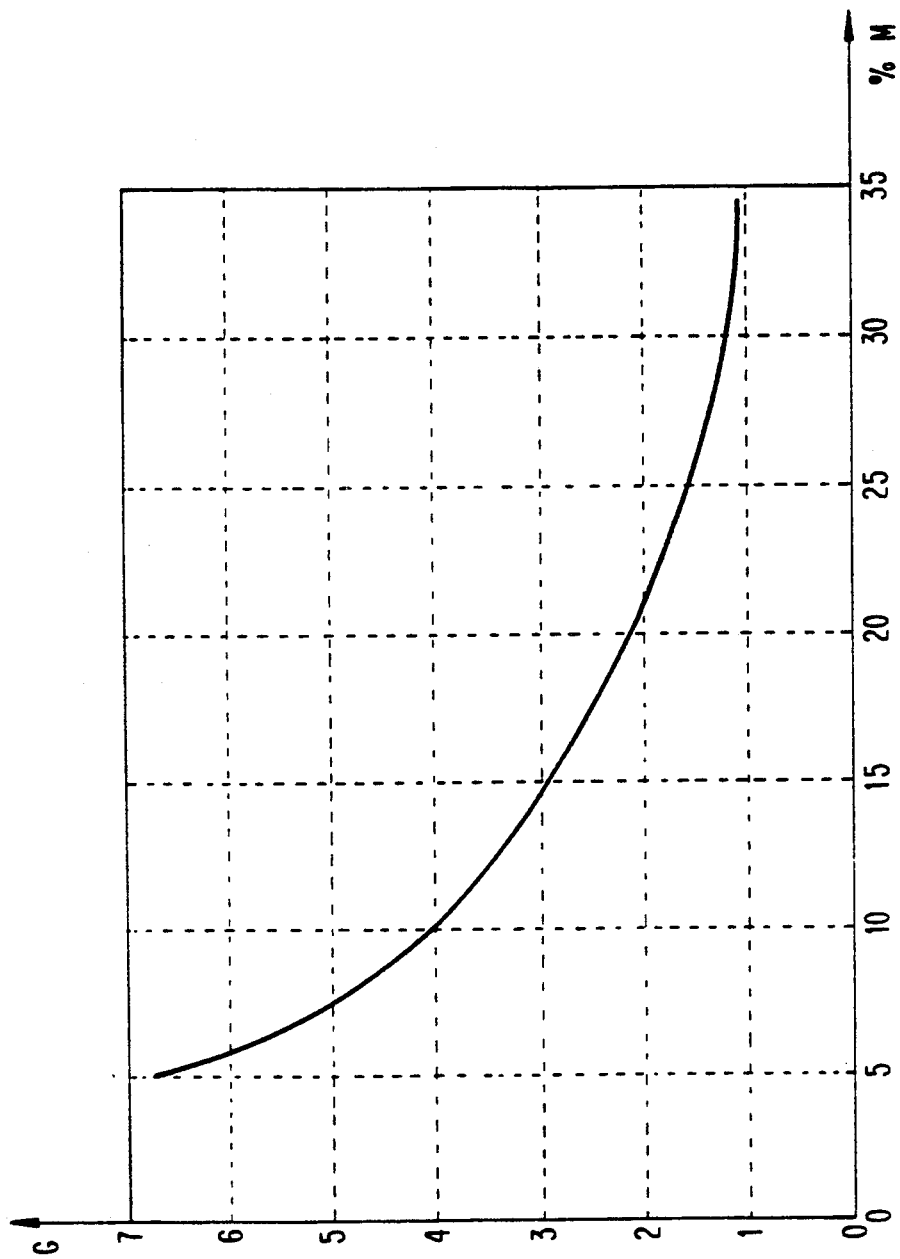
FIG. 2 is a diagram showing the gain in working range when implementing the invention compared to the implementation of a Gaussian beam.

FIG. 2 depicts this ratio.

For $M > 0.35$ ($=35\%$) the synthesized beam becomes very similar to the simple Gaussian beam and the working range is thus no more enhanced. On the other hand, for $M = 0.05$ the enhancement factor is above 6.5 (650%).

The first step in the construction of a beam generator according to this invention is to define the desired focusing distance F, namely the separation between the output plane of the beam generator to the center of the working range. In order to take advantage of the full working range $WR_c$, F must be greater than $$\frac{WR_c}{2}.$$

The amplitude field distribution at the output plane of the generator is defined by substituting in the set of equations (9) or the approximate equation (11) z by $-F$ and the appropriate values for $\theta$ and H.

Figure 3:
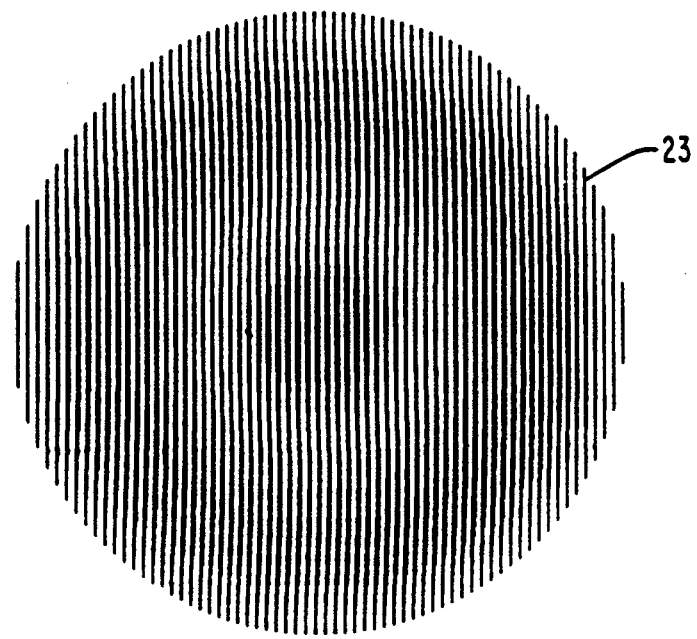
FIG. 3 displays an exemplary computer generated hologram of a type used in the invention to generate the required amplitude and phase distribution while illuminating it by a collimated beam from a laser source.

Realization of this amplitude and phase field distribution is achieved, in accordance with the invention, by passing conventional light beam of known amplitude and phase distribution, e.g. a Gaussian beam, through a semi-transparent plate 23 bearing a fringe pattern, such as shown in FIG. 3. This plate 23 is essentially a diffraction element known as computer generated hologram (or CGH) and is based on well-known technology such as described in Vasara et al., "Realization of General Non-Diffracting Beams with Computer Generated Holograms", J. Opt. Soc. Am. A, 6, No. 11, 1748 (1989). The CGH is characterized by a pattern of generally parallel lines of varying thickness and spacing to control, respectively, the amplitude and phase distribution of the diffracted beam passing through it. The CGH 23 is preferably disk-shaped, and with its concentric series of "bands" shown in FIG. 3, converts and incoming conventional beam into the desired beam with long working range.

The fringe pattern shown in FIG. 3 consists of black lines on transparent background. It is possible to transform the pattern of black lines to a pattern of transparent lines which affect the phase, rather than the amplitude, of the illuminating light beam.

Figure 5:
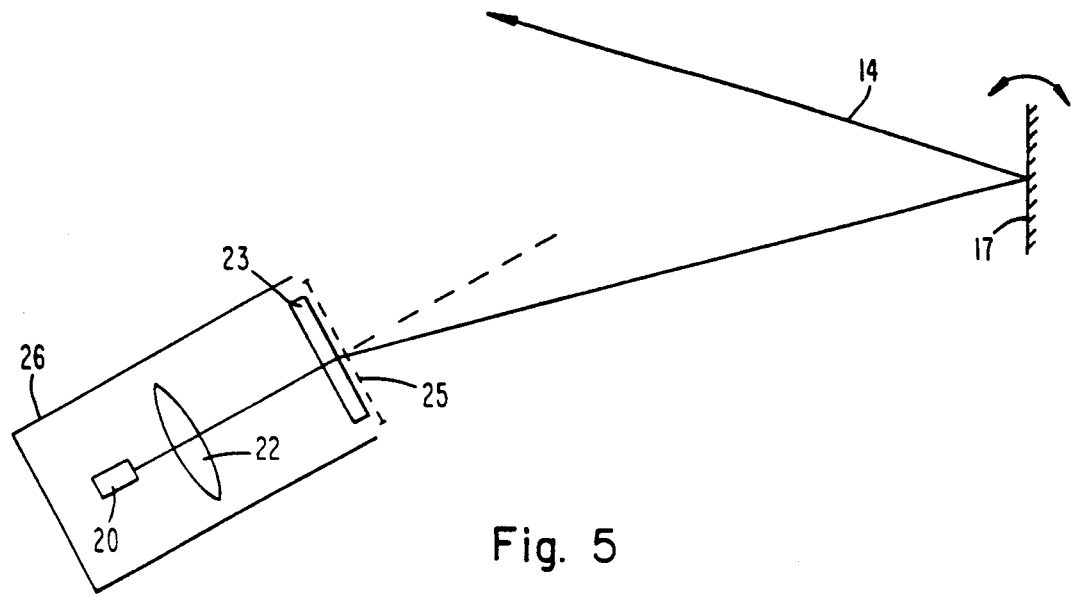
FIG. 5 is a symbolic diagram showing a setup for beam generation in accordance with a first embodiment of the invention.

It is advantageous to reduce the variations of the fringe density necessary on the CGH by optimally using it in conjunction with a collimated or converging beam illumination, readily obtainable with a lens. Thus, referring to FIG. 5, a laser source 20 generates a beam 14 that is passed through a lens 22 and CGH 23, reflected from scan mirror 17 and impinged on a pattern. The arrangement and operation of these elements will be described in more detail below with reference to FIG. 4. The synthesized beam, at the output of CGH 23, is characterized by a long working range of operation, particularly at medium MTF. FIG. 5 is a close view of the beam generator in FIG. 4.

Figure 6:
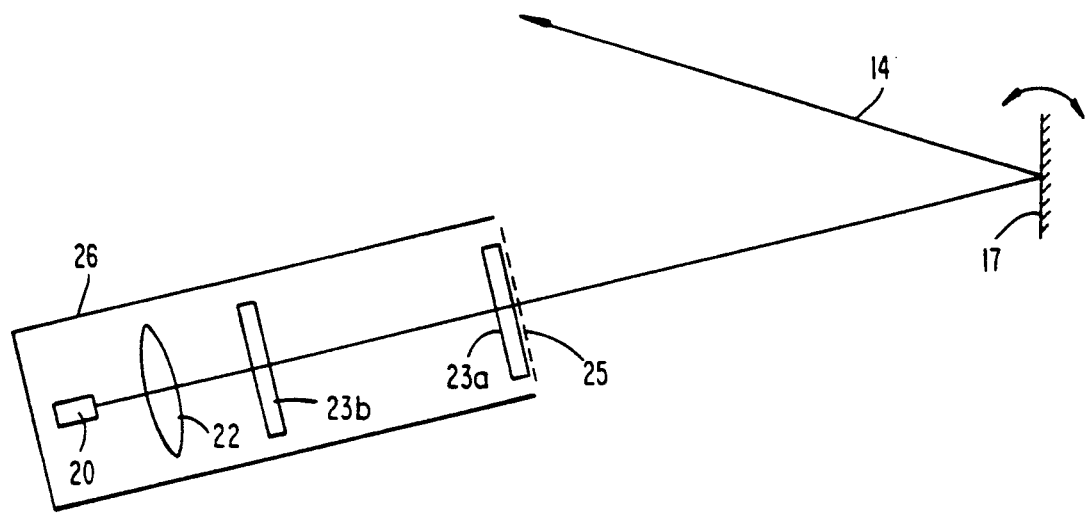
FIG. 6 is a diagram of a second embodiment of the invention.

The diffracted beam by this conventional CGH implementation contains only a small fraction of the light energy of the original beam (before diffraction) and the direction of propagation is not collinear. Those deficiencies are readily overcome by cascading more lenses and diffracting elements in the path of the beam. For example, shown in FIG. 6, there are two diffracting elements in the path of the beam. The first one (23b) projects on the second (23a) the light intensity distribution as evaluated using the form (10) or the approximate expression (12). In this configuration both diffracting elements 23a, 23b may be of the "phase-only" kind, whereby the spatial frequency of the fringe pattern varies, while locally maintaining equal width for bars and spaces. Moreover special phase-only CGH embodiments known as blased gratings, binary optics, kinoforms or diamond turned aspheric lenses, all of them working at nearly 100% efficiency and on zero order of diffraction (collinear output beam), are readily implementable.

Figure 7:
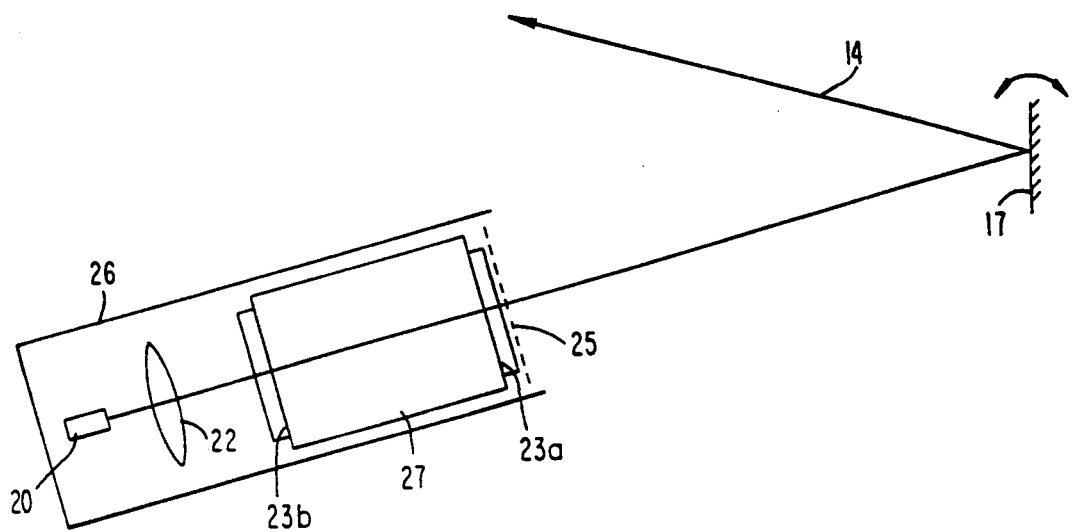
FIG. 7 is a diagram of a third embodiment of the invention.

The additional CGH (23b) generates a predetermined intensity pattern on a given plane. This element can be manufactured by any one of the embodiments mentioned above. FIG. 7 shows one possible way of mounting both diffracting surfaces on the same optically transparent substrate, rod or prism.

Figure 8:
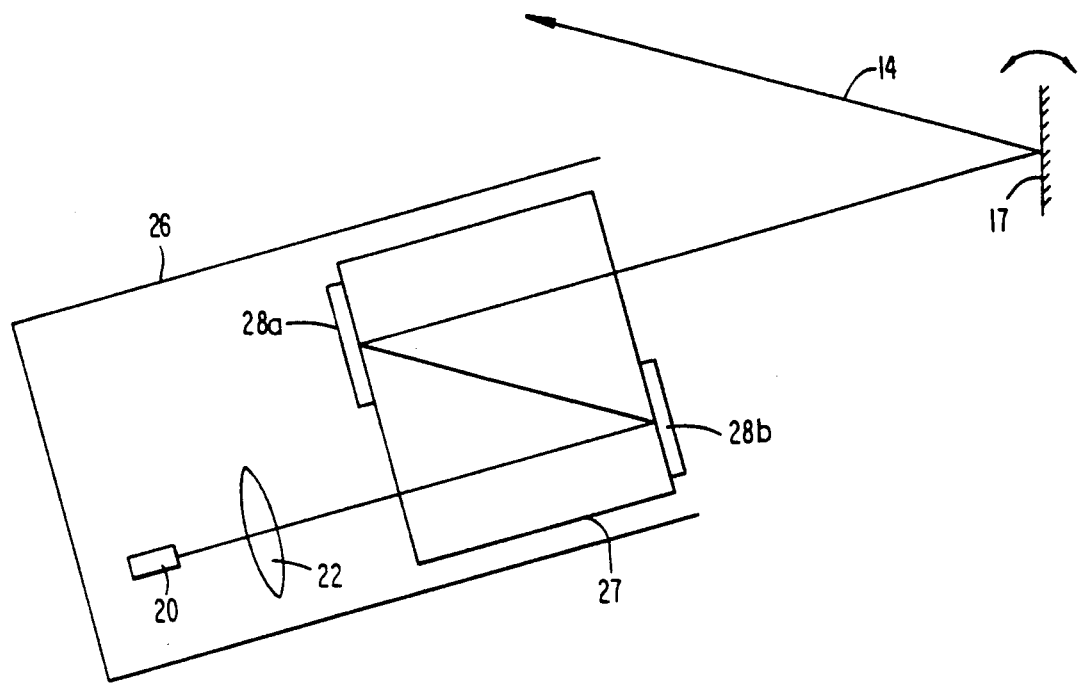
FIG. 8 is a diagram of a fourth embodiment of the invention.

One can design CGH elements that can be used in a reflection mode as shown in FIG. 8. (All CGH elements described earlier can be readily conceived to work in a reflection mode.) The CGH's in the shown configuration (FIG. 8) operate in the first order of diffraction. Therefore the angle of reflection differs from the angle of incidence.

Figure 9:
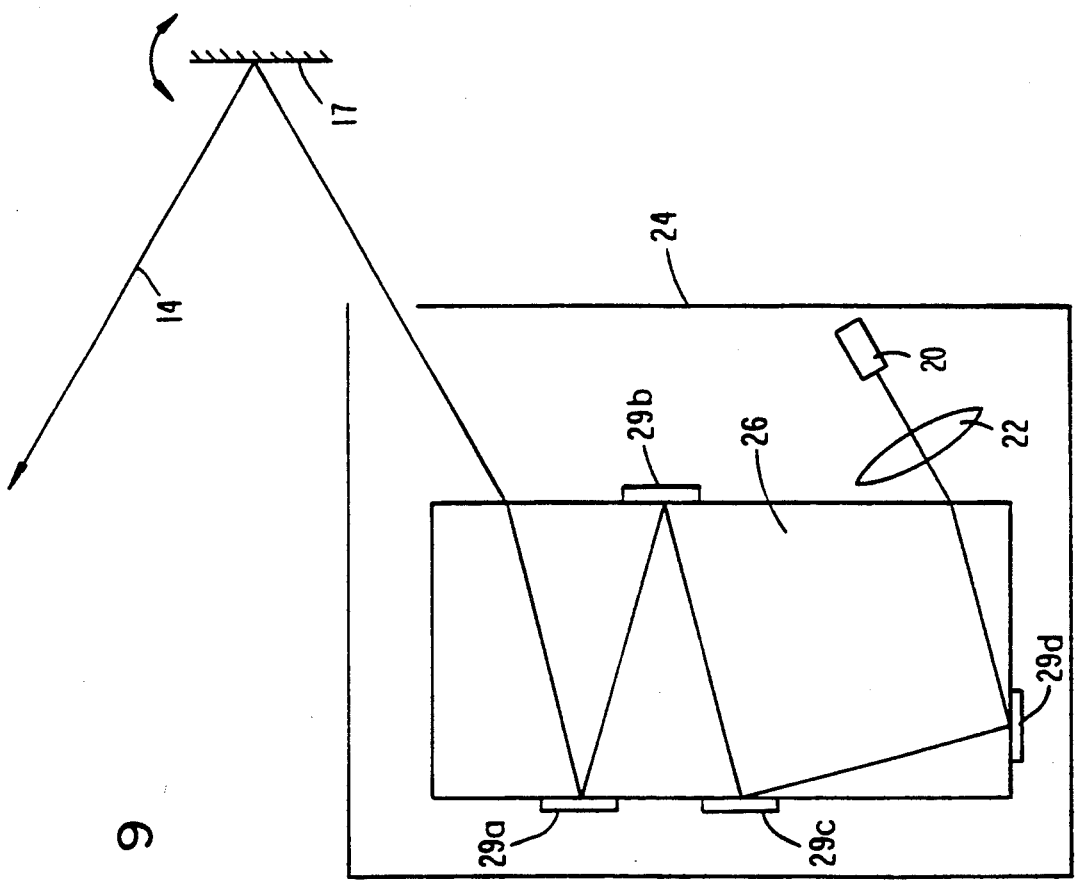
FIG. 9 is a diagram of a fifth embodiment of the invention.

FIG. 9 shows still another example of a beam generator. The last element (29a) is a zero order reflection CGH. It is preceded by another CGH of the same kind (29b) that projects the wanted intensity distribution on the last element (29a) which modulates only the phase. Between the collimating lens and the CGH generating the desired intensity distribution, there are two additional reflecting blazed gratings (29c, 29d) working in their first order of diffraction mode. The task of these gratings is to correct the astigmatism and/or anamorphism of a laser diode beam collimated by the lens (22). For a circular laser beam, these elements are omitted.

All configurations of the beam generator for extended working range beams can be implemented for any other electromagnetic wave, belonging to visible, ultra-violet or infrared wavelengths as well as in radio waves and acoustic waves. Moreover, for radio wave beam forming, use of phased array elements could generate directly the required amplitude and phase distribution, as needed at the beam generator output plane.

FIG. 4 depicts a hand-held laser scanner device 10 for reading symbols, implementing the principles of the invention. The laser scanner device 10 includes a housing that is generally of the type shown in the above-mentioned patents having a barrel portion 11 and a handle 12. Although the drawing depicts a hand-held pistol-shaped housing, the invention may also be implemented in other types of scanner housing, such as a desk-top workstation or stationary scanner. In the illustrated embodiment, the barrel portion 11 of the housing includes an exit port or window 13 through which the outgoing laser light beam 14 passes to impinge on and scan across the barcode symbol 15 located at some distance from the housing.

The laser beam 14 moves across the symbol 15 to create a scan pattern. Typically, the scanning pattern is one dimensional or linear, as shown by line 16. This linear scanning movement of the laser beam 14 is generated by an oscillating mirror 17 driven by a stepping motor 18. If desired, means may be provided to scan the beam 14 through a two dimensional scanning pattern, to permit reading of two dimensional information patterns. Also, instead of the oscillating mirror, means may be provided to move the source of beam 14 and/or target to produce the desired beam scanning effect. The mirror 17 may be planar, as shown, or of another suitable configuration.

A manually actuated trigger 19 or similar means permit the operator to initiate the scanning operation when the operator aims the device 10 at the symbol 15. Use of the trigger switch reduces the power drain since the components, such as the laser light source, the scan motor 18, and the photodetector and the decoders, can be activated during limited periods of actual scanning of a symbol rather than at all times.

The scanner device 10 includes a laser source 20, e.g., a gas laser tube or a semiconductor laser diode, mounted within the housing. The laser source 20 directs the laser beam 14 through the optical means 9 comprising the diffracting elements and optional lenses 22, to modify and direct the laser beam onto the oscillating mirror 17. The mirror 17, mounted on a vertical shaft and rotated by the motor drive 18 about a vertical axis, reflects the beam and directs it through the exit port 13 to the symbol 15. A photodetector 21 is positioned within the housing to receive at least a portion of the light reflected from the barcode symbol 15. The photodetector 21 may face toward the window 13. Alternatively, a convex portion of the scan mirror 17 may focus reflected light on the photodetector 21, in which case the photodetector faces toward the scan mirror. As the beam 14 sweeps the symbol 15, the photodetector 21 detects the light reflected from the symbol 15 and creates an analog electrical signal proportional to the reflected light. A digitizer (not shown) typically converts the analog signal into a pulse width modulated digital signal, with the pulse widths and/or spacings corresponding to the physical widths of the bars and spaces of the scanned symbol 15. A decoder (not shown), typically comprising a programmed microprocessor with associated RAM and ROM, decodes the pulse width modulated digital signal according to the specific symbology to derive a binary representation of the data encoded in the symbol, and the alphanumeric characters represented by the symbol.

To operate the scanner device 10, the operator depresses trigger 19 which activates the laser source 20 and stepper motor 18, etc. The laser source 20 generates laser beam 14 which passes through the hologram plate and lens combination. The hologram plate modulates the beam to create a multiplicity of beams that together represent a synthesized beam which does not vary substantially over the working range 24. The hologram plate 23 directs the synthesized beam onto the rotary mirror 17, which reflects the beam outwardly from the scanner housing 11 and toward the barcode symbol 15 in a sweeping pattern, i.e., along scan line 16. A barcode symbol 15, placed at any point within the distance 24 and approximately normal to the laser beam 14, reflects a portion of the laser light. The photodetector 21, mounted in the scanner housing 11, detects the reflected light and converts the received light into an analog electrical signal. The system circuitry then converts the analog signal to a pulse width modulated digital signal which the microprocessor based decoder decodes according to the characteristics of the barcode symbology rules.

Still other objects and advantages of the present invention will become readily apparent to those skilled in this art from the preceding detailed description, wherein only one embodiment of the invention is shown and described, simply by way of illustration of one mode contemplated of carrying out the invention. As will be realized, the invention is capable of other and different embodiments, and its several details are capable of modifications in various obvious respects, all without departing from the invention. Accordingly, the drawing and description are to be regarded as illustrative in nature, and not as restrictive. For example, the concepts described in this disclosure are applicable to wave propagation outside the optical visible range. Thus, one can apply the principles of this invention to the infrared region to generate beams with extended working range for two dimensional barcode readers, image scanners, plotters, laser machining devices, radar (lightwave or radiowave) and sonar devices, as well as other devices and systems capable to operate at minimum MTF values lower than 35%.

We claim:

1. A device for generating a narrow beam with limited spread along the beam's propagation direction, said device comprising:
   (a) a radiation source;
   (b) means for producing, from said radiation source, an effect of a plurality of Gaussian beams surrounding a common axis and intersecting in a common spatial region to define a synthesized long working range beam; and
   (c) means for directing said synthesized long working range beam toward at least one preferred direction.

2. A device as in claim 1, wherein said radiation source is a light source.

3. A device as in claim 2, wherein said light source comprises means for generating a laser beam.

4. A device as in claim 2, wherein said means for producing comprises a computer generated holographic (CGH) plate located in a propogation path of light from said light source, and CGH primarily modulating the phase of the light from said light source.

5. A device as in claim 2, wherein light from said light source is collimated.

6. A device as in claim 1, wherein said means for producing comprises two or more diffractive elements, sequentially located along a propagation direction of radiation from said radiation source.

7. A device as in claim 6, wherein said diffractive elements also correct for astigmatism or anamorphism of the radiation source.

8. A scanner for scanning optically encoded indicia of varying light reflectivity, said scanner comprising:
   (a) a light source for generating a collimated Gaussian beam of light;
   (b) means for producing from said Gaussian beam of light, an effect of a plurality of Gaussian beams surrounding a common axis and intersecting in a common spatial region to produce a synthesized long working range beam;
   (c) means for directing said synthesized beam toward indicia to be scanned and for causing the synthesized beam to move along a scan line; and
   (d) a light detector positioned to receive light reflected from said indicia.

9. A scanner as in claim 8, wherein said light source is a laser.

10. A scanner as in claim 9, wherein said means for producing an effect of a plurality of Gaussian beams comprises a plate bearing a predefined pattern of closely spaced lines of varying width and waviness that yield a desired amplitude and phase modulation of the incoming collimated Gaussian beam of light.

11. A scanner as in claim 9, wherein said means for producing an effect of a plurality of Gaussian beams comprises a computer generated holographic (CGH) plate positioned in a path of said light beam.

12. A scanner as in claim 9, wherein said means for producing an effect of a plurality of Gaussian beams comprises a plurality of serially arranged plates bearing phase grating patterns.

13. A scanner as in claim 8, wherein said means for producing an effect of a plurality of Gaussian beams comprises at least two computer generated holographic (CGH) plates positioned in the path of said collimated Gaussian beam of light.

14. A scanner as in claim 8, wherein said intersection of Gaussian beams produces a field distribution $U_c(r,z)$ described by $$U_c(r,z) = A_z \exp\left(-\frac{\pi r^2}{\lambda(H - iz)}\right) J_0\left(\frac{2\pi}{\lambda} r\theta \frac{1 + i\frac{z}{H}}{1 + \frac{z^2}{H^2}}\right).$$

15. A scanner for scanning optically encoded indicia of varying light reflectivity, said scanner comprising:
   (a) means for generating an effect of a plurality of Gaussian light beams angularly displaced about a common axis by a given angle and intersecting each other in a common spatial region to form a synthesized beam of light;
   (b) means for directing said synthesized beam of light toward indicia to be scanned and for causing the synthesized beam to move along a scan line; and
   (c) a light detector positioned to receive light reflected from said indicia.

16. A scanner as in claim 15, wherein said means for generating comprises a laser producing a collimated Gaussian beam of light.

17. A scanner as in claim 16, wherein said light beam generating means further comprises a plate bearing an amplitude and phase grating pattern of closely spaced lines of varying thickness and waviness corresponding to desired amplitude and phase modulation of the collimated Gaussian beam of light produced by the laser.

18. A scanner as in claim 16, wherein said means for generating further comprises a computer generated holographic (CGH) plate positioned in a path of said laser.

19. A scanner as in claim 18, wherein a plurality of computer generated holographic (CGH) plates having prescribed different patterns thereon are positioned in the path of said laser.

20. A scanner as in claim 16, wherein said means for generating further comprises a plurality of plates bearing phase grating patterns serially arranged along a path of the collimated Gaussian Beam of light produced by the laser.

21. A scanner as in claim 15, wherein said intersection of Gaussian beams produces a field distribution $U_c(r,z)$ of $$U_c(r,z) \simeq A_z \exp\left(-\frac{\pi r^2}{\lambda(H-iz)}\right) J_0\left(\frac{2\pi}{\lambda} r\theta \frac{1+i\frac{z}{H}}{1+\frac{z^2}{H^2}}\right).$$

22. A method of scanning a symbol, comprising the steps of:
generating an effect of a plurality of Gaussian light beams of prescribed relative amplitudes and phases, surrounding a common axis and intersecting each other in a common spatial region to form a synthesized beam of light;
directing said synthesized beam of light toward a symbol to be scanned and causing the synthesized beam to move along a scan line; and
detecting light reflected from said symbol.

23. A method as in claim 22, including the steps of generating a single Gaussian beam of light, and locating an amplitude and phase grating of predefined pattern in a path of said single Gaussian beam to produce said synthesized beam.

24. A method as in claim 23, wherein said single Gaussian beam of light comprises a laser beam.

25. A method as in claim 24, wherein said amplitude and phase grating comprises a computer generated hologram (CGH).

26. A method as in claim 22, including the steps of generating a single Gaussian beam of light, and locating at least two phase gratings serially in a path of said single Gaussian beam to produce said synthesized beam.

27. A method as in claim 26, wherein said phase gratings comprise computer generated holograms (CGH).

28. A method as in claim 22, wherein said plurality of Gaussian beams together form a 360 degree fan of Gaussian beams surrounding the common axis.

29. A method as in claim 22, wherein the symbol to be scanned comprises a bar code.

30. A bar code reader comprising:
a housing;
symbol detection means, contained in said housing, for generating a laser beam directed along a path toward a bar code symbol to be read and for receiving light reflected from the bar code symbol to produce electrical signals corresponding to the intensity of the reflected light; and
means, positioned in said path, for generating from said laser beam an effect of a plurality of Gaussian light beams angularly displaced about a common axis by a given angle and intersecting each other in a common spatial region to form a synthesized beam of light which impacts on and is reflected by said bar code symbol.

31. A bar code reader as in claim 30, wherein said means for generating comprises a plate bearing an amplitude and phase grating pattern of closely spaced lines of varying thickness and waviness for producing amplitude and phase modulation of the laser beam.

32. A bar code reader as in claim 31, wherein said means for generating further comprises another plate, positioned in said path, said another plate bearing a different amplitude and phase grating pattern of closely spaced lines of varying thickness and waviness for producing additional amplitude and phase modulation of the laser beam.

33. A bar code reader as in claim 30, wherein said means for generating comprises a computer generated holographic plate.

34. A bar code reader as in claim 33, wherein said means for generating further comprises another computer generated holographic plate positioned in said path.

35. A bar code reader as in claim 33, wherein said plate is of a type and is arranged in said path so as to operate in a reflection mode.

36. A bar code reader as in claim 34, wherein at least one of said plates is of a type and is arranged in said path so as to operate in a reflection mode.

37. A bar code reader as in claim 30, further comprising means for causing the synthesized beam to move along a scan pattern across a surface on which the symbol appears.

* * * * *

UNITED STATES PATENT AND TRADEMARK OFFICE
CERTIFICATE OF CORRECTION

PATENT NO. : 5,315,095

DATED : May 24, 1994

INVENTOR(S) : Emanuel MAROM et al.

It is certified that error appears in the above-indentified patent and that said Letters Patent is hereby corrected as shown below:

On the title page, please delete item [73] and replace it with the following:

--[73] Ramot University for Applied Research & Industrial Development Ltd., Tel Aviv, Israel--

Column 3, line 14, after "where" insert --$\lambda$--;

Column 3, line 21, change "$\exp(-r^2/\omega_o^2)$" to

--$\exp(-r^2/\omega_o^2)$--;

Column 3, line 32, change "$(=2\omega o)$" to --$(=2\omega_o)$--.

Column 6, delete the formula between lines 10 and 15 and replace with the following:

$$\left(=\frac{\pi\omega_o^2}{\lambda}\right)$$

Column 6, line 19, change "$i=\sqrt{-1}$" to $$i=\sqrt{-1}$$

UNITED STATES PATENT AND TRADEMARK OFFICE
CERTIFICATE OF CORRECTION

PATENT NO. : 5,315,095
DATED : May 24, 1994
INVENTOR(S) : Emanuel MAROM et al.

It is certified that error appears in the above-indentified patent and that said Letters Patent is hereby corrected as shown below:

Column 6, delete the formula between lines 35 and 40 and replace with the following:

$$MTF = \exp\left\{-\frac{\pi^2 \omega^2(z) f^2}{2}\right\} \quad (5)$$

Column 6, delete the formula between lines 45 and 50 and replace with the following:

$$WR = 2H = 2\frac{\pi \omega_o^2}{\lambda} \quad (6)$$

Column 6, line 51, delete the formula and replace with the following:

$$\omega^2(H) = 2\omega_o^2 \quad (7)$$

UNITED STATES PATENT AND TRADEMARK OFFICE
CERTIFICATE OF CORRECTION

PATENT NO. : 5,315,095
DATED : May 24, 1994
INVENTOR(S) : Emanuel MAROM et al.

It is certified that error appears in the above-indentified patent and that said Letters Patent is hereby corrected as shown below:

Column 6, delete the formula between lines 55 and 60 and replace with the following:

$$WR_g = \frac{2}{\pi \lambda f^2} L \qquad (8)$$

Column 6, delete line 61 and the formula between lines 62 and 65 and replace with the following:

L denoting $\ln \frac{1}{M}$

Column 7, line 3, after "integral" insert --form as--;
Column 7, line 10, change "resin θ" to --r sin θ--;
Column 7, delete the formula between lines 30 and 35 and replace with the following:

$$|A_z|^2 \exp\left\{\frac{-2\pi r^2}{\lambda H\left(1 + \frac{z^2}{H^2}\right)}\right\} \left| J_o\left(\frac{2\pi}{\lambda} r\theta \frac{1 + i\frac{z}{H}}{1 + \frac{z^2}{H^2}}\right) \right|^2 \qquad (12)$$

UNITED STATES PATENT AND TRADEMARK OFFICE
CERTIFICATE OF CORRECTION

PATENT NO. : 5,315,095
DATED : May 24, 1994
INVENTOR(S) : Emanuel MAROM et al.

It is certified that error appears in the above-indentified patent and that said Letters Patent is hereby corrected as shown below:

Column 7, delete the three formulas between lines 45 and 50 and replace with the following:

$$\theta = f\lambda t \qquad (13)$$

$$H = \frac{1}{\lambda f^2} h^2 \qquad (14)$$

Column 7, delete the formula between line 58 and 62 and replace with the following:

$$L = \ln\frac{1}{M}$$

Column 7, delete the formula between lines 65 and 68 and replace with the following:

$$WR_c = \frac{2}{\pi \lambda f^2} d \qquad (17)$$

UNITED STATES PATENT AND TRADEMARK OFFICE
CERTIFICATE OF CORRECTION

PATENT NO. : 5,315,095
DATED : May 24, 1994
INVENTOR(S) : Emanuel MAROM et al.

It is certified that error appears in the above-indentified patent and that said Letters Patent is hereby corrected as shown below:

Column 8, delete the equation between lines 3 and 6 and replace with the following:

$d = 12.4 - 28.8L + 24.2L^2 - 7.81L^3 + 1.08 L^4;$
$0.05 < M < 0.35$ (18)

Signed and Sealed this

Sixth Day of December, 1994

Attest:

BRUCE LEHMAN

Attesting Officer

Commissioner of Patents and Trademarks

UNITED STATES PATENT AND TRADEMARK OFFICE
CERTIFICATE OF CORRECTION

PATENT NO. : 5,315,095
DATED : May 24, 1994
INVENTOR(S) : Emanuel MAROM et al.

It is certified that error appears in the above-indentified patent and that said Letters Patent is hereby corrected as shown below:

On the title page, please delete item [73] and replace it with the following:

--[73]  Ramot University Authority for Applied Research & Industrial Development Ltd., Tel Aviv, Israel--

Column 3, line 14, after "where" insert $--\lambda--$;

Column 3, line 21, change "$\exp(-r^2/\omega_0^2)$" to $--\exp(-r^2/\omega_0^2)--$;

Column 3, line 32, change "$(=2\omega o)$" to $--(=2\omega_o)--$.

Column 6, delete the formula between lines 10 and 15 and replace with the following:

$$\left(=\frac{\pi\omega_o^2}{\lambda}\right)$$

Column 6, line 19, change "$i=\sqrt{-1}$" to $$i=\sqrt{-1}$$

UNITED STATES PATENT AND TRADEMARK OFFICE
CERTIFICATE OF CORRECTION

PATENT NO. : 5,315,095
DATED : May 24, 1994
INVENTOR(S) : Emanuel MAROM et al.

It is certified that error appears in the above-indentified patent and that said Letters Patent is hereby corrected as shown below:

Column 6, delete the formula between lines 35 and 40 and replace with the following:

$$MTF = \exp\left\{-\frac{\pi^2 \omega^2(z) f^2}{2}\right\} \quad (5)$$

Column 6, delete the formula between lines 45 and 50 and replace with the following:

$$WR = 2H = 2\frac{\pi \omega_o^2}{\lambda} \quad (6)$$

Column 6, line 51, delete the formula and replace with the following:

$$\omega^2(H) = 2\omega_o^2 \quad (7)$$

UNITED STATES PATENT AND TRADEMARK OFFICE
CERTIFICATE OF CORRECTION

PATENT NO. : 5,315,095
DATED : May 24, 1994
INVENTOR(S) : Emanuel MAROM et al.

It is certified that error appears in the above-indentified patent and that said Letters Patent is hereby corrected as shown below:

Column 6, delete the formula between lines 55 and 60 and replace with the following:

$$WR_g = \frac{2}{\pi \lambda f^2} L \qquad (8)$$

Column 6, delete line 61 and the formula between lines 62 and 65 and replace with the following:

L denoting $\ln \frac{1}{M}$

Column 7, line 3, after "integral" insert --form as--;
Column 7, line 10, change "resin θ" to --r sin θ--;
Column 7, delete the formula between lines 30 and 35 and replace with the following:

$$|A_z|^2 \exp\left\{\frac{-2\pi r^2}{\lambda H \left(1 + \frac{z^2}{H^2}\right)}\right\} \left| J_o\left(\frac{2\pi}{\lambda} r\theta \frac{1+i\frac{z}{H}}{1+\frac{z^2}{H^2}}\right) \right|^2 \qquad (12)$$

UNITED STATES PATENT AND TRADEMARK OFFICE
CERTIFICATE OF CORRECTION

PATENT NO. : 5,315,095
DATED : May 24, 1994
INVENTOR(S) : Emanuel MAROM et al.

It is certified that error appears in the above-indentified patent and that said Letters Patent is hereby corrected as shown below:

Column 7, delete the three formulas between lines 45 and 50 and replace with the following:

$$\theta = f\lambda t \qquad (13)$$

$$H = \frac{1}{\lambda f^2} h^2 \qquad (14)$$

Column 7, delete the formula between line 58 and 62 and replace with the following:

$$L = \ln\frac{1}{M}$$

Column 7, delete the formula between lines 65 and 68 and replace with the following:

$$WR_c = \frac{2}{\pi \lambda f^2} d \qquad (17)$$

UNITED STATES PATENT AND TRADEMARK OFFICE
CERTIFICATE OF CORRECTION

PATENT NO. : 5,315,095
DATED : May 24, 1994
INVENTOR(S) : Emanuel MAROM et al.

It is certified that error appears in the above-indentified patent and that said Letters Patent is hereby corrected as shown below:

Column 8, delete the equation between lines 3 and 6 and replace with the following:

$$d = 12.4 - 28.8L + 24.2L^2 - 7.81L^3 + 1.08 L^4; \quad 0.05 < \dot{M} < 0.35 \quad (18)$$

This certificate supersedes Certificate Correction issued December 6, 1994.

Signed and Sealed this

Ninth Day of May, 1995

Attest:

BRUCE LEHMAN

Attesting Officer          Commissioner of Patents and Trademarks